Patented May 22, 1951

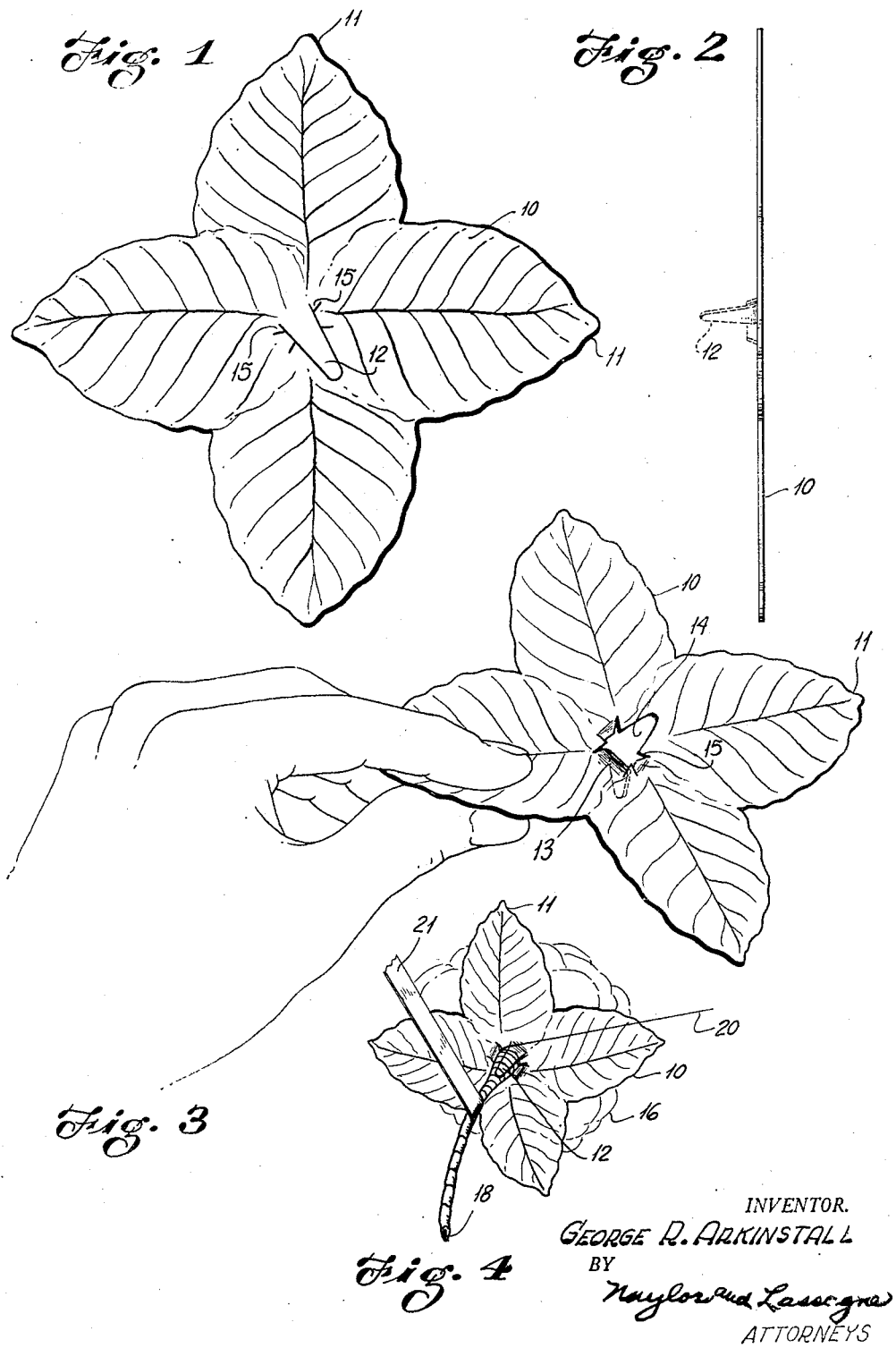

2,553,953

UNITED STATES PATENT OFFICE 2,553,953

FLOWER COLLAR

George R. Arkinstall, Oakland, Calif.

Application August 6, 1949, Serial No. 108,979

3 Claims. (Cl. 41—13)

This invention relates to flower collars of the type which may be applied by a florist when setting the bloom up as a boutonniere or as a corsage. It is known, of course, that artificial collars, made of water-resistant paper or the like, have been colored and die struck in simulation of natural leaves and used as a backing piece for advantageous ornamentation of the bloom as well as to serve as protection for the clothing of the wearer. In some instances these leaf-like devices have assumed a cruciform shape with a central aperture through which the flower stem is inserted. Some of the devices have a greater or lesser number of leaf-like sections, but all of them serve as a backing piece in the manner above stated.

The invention forming the subject matter hereof concerns itself with the provision of an integrated means of positively connecting the collar to the flower and thus prevent relative movement between the two or accidental dislodgment of the collar from the flower. The object of the invention is obtained by defining in the blank a tab which may be struck outwardly therefrom for positive engagement with the stem of the flower.

In the drawings wherein a preferred embodiment of the invention is illustrated,

Figure 1 is a plan view of the flower collar blank;

Figure 2 is an edge elevation of the device of Figure 1;

Figure 3 shows the collar in a stage of its shaping for attachment to a flower, and Figure 4 is a back view of the collar showing the mode of its attachment to a flower.

The collar 10 is die-struck or otherwise cut from flat paper stock which has first been dyed the appropriate shade, usually green in simulation of the natural color of leaves, and treated with known compositions to render it waterproof and to impart to it a texture likened to the feel of a natural leaf. In this embodiment the collar has four individual leaf blades 11 with the usual vein lines defined therein by cutting and impression, the leaves 11 being arranged in cruciform for sake of balance in the decoration to be imparted to the butonniere or corsage wherein the device is to be employed.

Centrally of the collar 10 a triangular tab or tongue 12 is cut into the stock with a hinge 13 by which it remains attached to the collar, this tab being the means by which the collar can be rigidly secured to the flower as will subsequently appear. The resulting opening 14 is rendered subject to enlargement to accommodate the stem or bud portion of the flower by the provision of slits 15 radiating outwardly from the opening 14.

In practice the blank 10 is first folded gently along the stem line of the individual leaves 11, as shown in Figure 3, to render the collar slightly concave or cup-like for close fit with a flower 16. The tab 12 is then struck through the collar to project from its back or reverse side, as shown in Figures 2 and 4. The stem 18 of the flower 16 is next threaded through the aperture 14 and the collar is drawn into a close fit with the back of the bloom. As shown in Figure 4, the tap 12 will then lay along the stem 18 of the flower for binding thereto in the chosen way. In Figure 4, the binding is shown as a wire 20 masked or finished off with a tape 21.

The resulting structure is a boutonniere or corsage having an unusual degree of firmness which will withstand repeated handling and wear without separation of the several parts. The device makes it possible to make effective use of the great numbers of flowers, such as gardenias, having imperfect or deficient leaf conformation, estimated to be the vast majority of the crop. With the device of this invention all such flowers may be rendered uniform in appearance and saleable for personal wear.

The invention claimed is:

1. A collar for stemmed flowers comprising a blank of sheet material simulating in form a pattern of plant leaves, means for sleeving said blank on flower stems of varied diameters comprising a centrally disposed aperture in said blank and a plurality of slits in said blank radiating outwardly from said aperture, and means enabling the binding of said blank to a flower stem comprising a tab-like member carried by said blank at an edge of said aperture, said member being of greater length than the portions of said blank defined between said slits and being deflectable to extend downwardly from the underside of said blank and normal thereto, whereby said collar may be lashed to the flower stem by a wrapping encircling said stem and member.

2. A collar for stemmed flowers, as set forth in claim 1, wherein said tab-like member is integral with said blank and is in the form of an elongate tongue complementary to said aperture, said tongue having a length considerably in excess of its width at its line of connection to said blank, and being of decreasing width in the direction of its free end.

3. A collar for stemmed flowers comprising a blank of sheet material simulating in form a pattern of plant leaves, an elongated aperture formed in the center of said blank, the edges of said blank forming the long sides of said aperture being substantially linear; opposed pairs of radial slits in said blank adjacent one end of said aperture, and a tongue integral with said blank and complementary to said aperture, said tongue being connected to the blank at that end of the aperture with respect to which said slits are adjacently located.

GEORGE R. ARKINSTALL.

REFERENCES CITED

The following references are of record in the file of this patent:

UNITED STATES PATENTS

| Number | Name | Date |
|---|---|---|
| 348,332 | McLane | Aug. 31, 1886 |
| 812,800 | McLean | Feb. 13, 1906 |
| 1,188,198 | Oshima | June 20, 1916 |
| 1,744,083 | Schmidt | Jan. 21, 1930 |
| 2,029,043 | Wendell | Jan. 28, 1936 |
| 2,197,220 | Kost | Apr. 16, 1940 |